United States Patent
Matsui et al.

(10) Patent No.: US 11,418,673 B2
(45) Date of Patent: Aug. 16, 2022

(54) ILLUMINATION DEVICE AND IMAGE READING DEVICE

(71) Applicant: Mitsubishi Electric Corporation, Tokyo (JP)

(72) Inventors: Hideki Matsui, Tokyo (JP); Koki Takasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/417,757

(22) PCT Filed: Dec. 24, 2019

(86) PCT No.: PCT/JP2019/050581
§ 371 (c)(1),
(2) Date: Jun. 24, 2021

(87) PCT Pub. No.: WO2020/174855
PCT Pub. Date: Sep. 3, 2020

(65) Prior Publication Data
US 2022/0078303 A1    Mar. 10, 2022

(30) Foreign Application Priority Data

Feb. 25, 2019  (JP) .............................. JP2019-031292

(51) Int. Cl.
*H04N 1/04*    (2006.01)
*H04N 1/028*    (2006.01)
(Continued)

(52) U.S. Cl.
CPC ......... *H04N 1/02855* (2013.01); *G02B 6/001* (2013.01); *G02B 6/0006* (2013.01);
(Continued)

(58) Field of Classification Search
CPC ............. H04N 1/02855; H04N 1/0249; H04N 1/02895; H04N 2201/0081; G02B 6/0006; G02B 6/001
(Continued)

(56) References Cited

U.S. PATENT DOCUMENTS 6,360,030 B1 * 3/2002 Kawai ................... H04N 1/031
358/484
2014/0355303 A1 12/2014 Fujiuchi et al.

FOREIGN PATENT DOCUMENTS

JP    2009-32664 A    2/2009
JP    2010-283436 A    12/2010
(Continued)

OTHER PUBLICATIONS

International Search Report and Written Opinion dated Feb. 25, 2020, received for PCT Application PCT/JP2019/050581, Filed on Dec. 24, 2019, 10 pages including English Translation.

*Primary Examiner* — Cheukfan Lee
(74) *Attorney, Agent, or Firm* — Xsensus LLP (57) ABSTRACT

An illumination device and an image reading device are characterized by including: a rod-shaped light guide extending in a longitudinal direction and configured to guide light entering from an exterior and emit the light as linear light from a lateral surface; a light guide holding portion having a hole into which an end surface of the light guide is inserted; a supporter supporting the light guide holding portion slidably along the longitudinal direction; and a housing supporting or housing the light guide, the light guide holding portion and the supporter, at least the supporter being fixed to the housing, a direction of sliding of the light guide holding portion being restricted to the longitudinal direction by a supporter-side concave-convex portion that is a supporter-side groove portion or a supporter-side
(Continued)

protruding portion at least one of which is formed on the supporter along the longitudinal direction.

20 Claims, 9 Drawing Sheets (51) Int. Cl.
*F21V 8/00* (2006.01)
*H04N 1/024* (2006.01)
(52) U.S. Cl.
CPC ....... *H04N 1/0249* (2013.01); *H04N 1/02895* (2013.01); *H04N 2201/0081* (2013.01)
(58) Field of Classification Search
USPC .................................................. 358/484, 475
See application file for complete search history.

(56) References Cited

FOREIGN PATENT DOCUMENTS

| | | | |
|---|---|---|---|
| JP | 2011-61411 A | 3/2011 | |
| JP | 2014-6979 A | 1/2014 | |

* cited by examiner

ILLUMINATION DEVICE AND IMAGE READING DEVICE

CROSS-REFERENCE TO RELATED APPLICATIONS

The present application is based on PCT filing PCT/JP2019/050581, filed Dec. 24, 2019, which claims priority to JP 2019-031292, filed Feb. 25, 2019, the entire contents of each are incorporated herein by reference.

TECHNICAL FIELD

The present disclosure relates to (i) an illumination device equipped with a light guide and (ii) an image reading device.

BACKGROUND ART

A light guide is made of a rod-shaped transparent body and is used for an illumination device (linear light source device). The illumination device (linear light source device) including a light guide is suitable for illumination by image reading devices such as facsimiles, copiers, scanners, and bill discriminators. Image reading devices include (i) image reading devices including an illumination device (linear light source device) inside a housing and (ii) image reading devices in which a reading target is arranged between the illumination device (linear light source device) and a lens body of the image reading device. Also, the illumination device (linear light source device) including the light guide includes a light source such as, for example, a light emitting diode (LED) or an organic electro-luminescence (EL) element. Light emitted from the light source enters from an end surface of the light guide (a light incident surface) and is guided, and the illumination device emits linear light from a light exit surface that is a lateral surface of the light guide.

Some conventional illumination devices for illumination of image reading devices each include a cover glass as a top plate (refer to, for example, Patent Literatures 1 and 2). In many cases, such a cover glass is also used as a top plate of an image reading device. Also, there is an illumination device (image reading device) in which a position of a light guide holder is restricted by a cover glass. Further, there is an illumination device (image reading device) including a mechanism for reducing the influence of expansion and contraction of the light guide body due to heat or the like (for example, refer to Patent Literatures 2 and 3).

In some cases, a cover glass is not required for the illumination device (image reading device). Such cases include, for example, a case in which a reading target is conveyed at a position away from a position at which the reading target touches the illumination device (image reading device), and a case in which there is a cover glass on the device-side that has the built-in illumination device (image reading device).

CITATION LIST

Patent Literature

Patent Literature 1: Unexamined Japanese Patent Application Publication No. 2014-6979 (see especially FIGS. 9 and 10)
Patent Literature 2: Unexamined Japanese Patent Application Publication No. 2010-283436 (see especially FIG. 1A)
Patent Literature 3: Unexamined Japanese Patent Application Publication No. 2011-61411 (see especially FIG. 3)

SUMMARY OF INVENTION

Technical Problem

However, conventional illumination devices (image reading devices) have a problem in that there is no consideration for enabling the light guide holder to be reliably supported regardless of the presence or absence of the cover glass of the illumination device (image reading device).

In order to solve the aforementioned problem, an objective of the present disclosure is to achieve an illumination device and an image reading device that enable support of a light guide holder by a simple structure.

Solution to Problem

An illumination device and an image reading device according to the present disclosure are characterized by including (i) a rod-shaped light guide extending in a longitudinal direction and configured to guide light entering from an exterior and emit the light as linear light from a lateral surface, (ii) a light guide holding portion having a hole into which an end surface of the light guide is inserted, (iii) a supporter supporting the light guide holding portion slidably along the longitudinal direction, and (iv) a housing supporting or housing the light guide, the light guide holding portion, and the supporter, at least the supporter being fixed to the housing, a direction of sliding of the light guide holding portion being restricted to the longitudinal direction by a supporter-side concave-convex portion that is a supporter-side groove portion or a supporter-side protruding portion, at least one of the supporter-side groove portion or a supporter-side protruding portion being formed on the supporter along the longitudinal direction.

Advantageous Effects of Invention

According to the present disclosure, an illumination device and an image reading device can be achieved that can support the light guide holding portion while restricting a direction of sliding of the light guide holding portion including a light guide holder and a light source base plate.

DESCRIPTION OF EMBODIMENTS

Embodiment 1

Figure 1A:
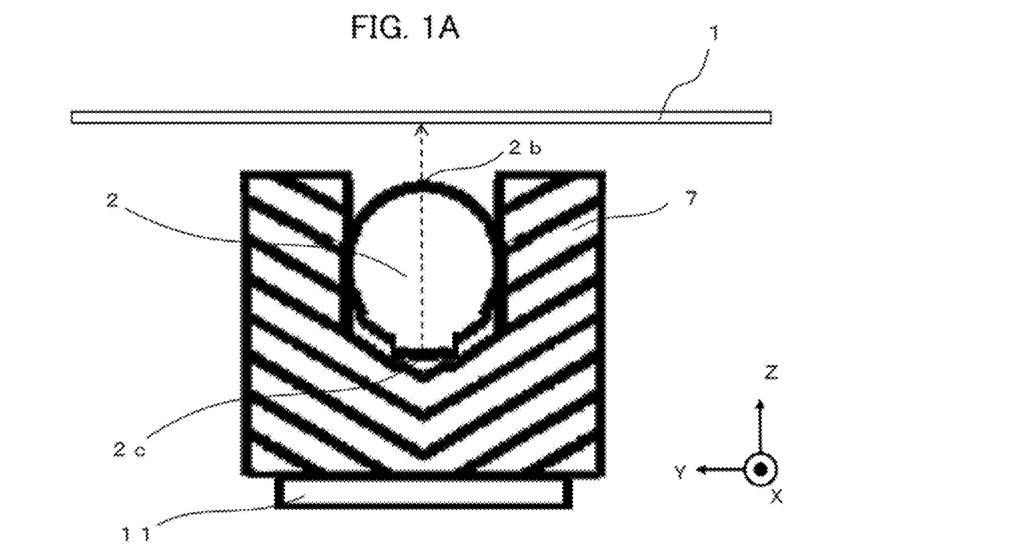
FIG. 1A is a cross-sectional view of an illumination device and an image reading device according to Embodiment 1.
Figure 1B:
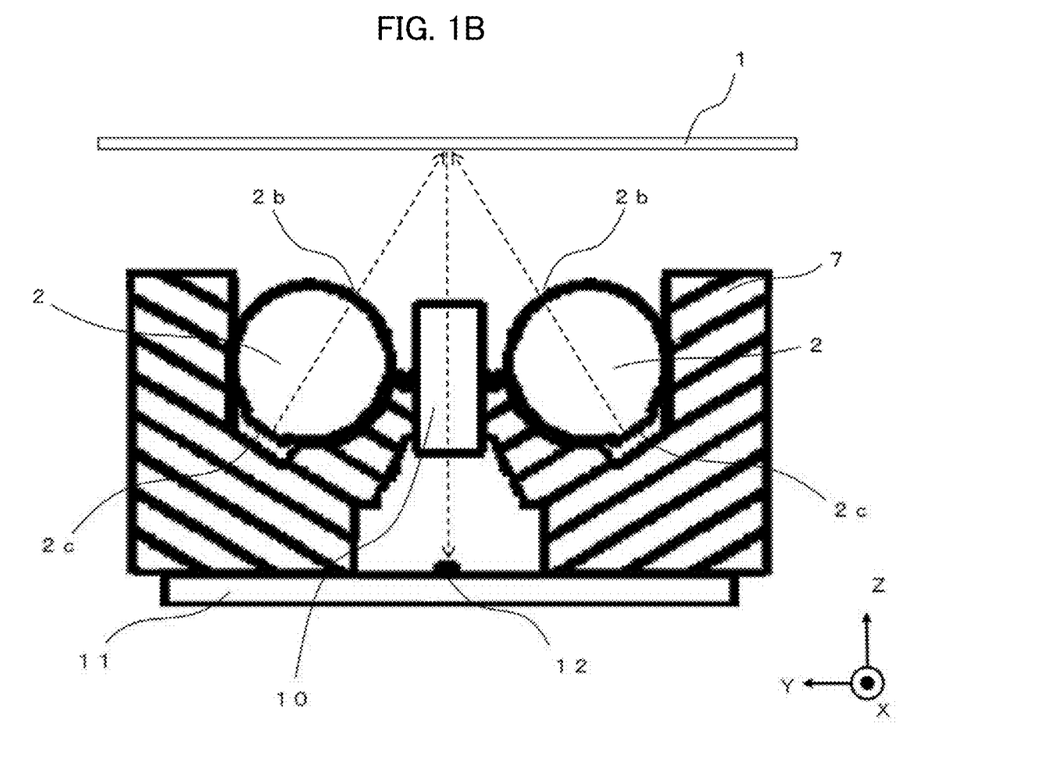
FIG. 1B is a cross-sectional view of another illumination device and another image reading device according to Embodiment 1.

Hereinafter, an illumination device and an image reading device according to Embodiment 1 are described with reference to FIGS. 1A to 8. FIG. 1A is a cross-sectional view of the illumination device in a case in which a single light guide 2 is used. FIG. 1B is a cross-sectional view of the illumination device in a case in which two light guides 2 are used. The portion A surrounded by a dashed-and-double-dotted line in FIG. 2 corresponds to an enlarged peripheral portion of a light guide holding portion 3 whose movement direction is restricted by a supporter 8 described later. The portion B surrounded by a dashed-and-double-dotted line in FIG. 2 corresponds to an enlarged peripheral portion of the light guide holding portion 3 that does not have the below-described supporter 8. In FIGS. 2 to 8, the image reading device is illustrated in a representative manner with the illumination device omitted. Components that are the same or equivalent are assigned the same reference signs throughout the drawings, and detailed descriptions of such components are omitted. The longitudinal direction and the transverse direction in the illumination device according to the Embodiment 1 respectively correspond to a main scanning direction and a sub-scanning direction in the image reading device according to Embodiment 1. Since an illumination target 1 (reading target 1) is relatively conveyed in the transverse direction (sub-scanning direction), the transverse direction and the sub-scanning direction are also referred to as a conveyance direction.

The illumination target 1 (reading target 1) is an object to be illuminated with light (linear light) emitted from the illumination device according to Embodiment 1. Furthermore, the reading target 1 (illumination target 1) can be said to be a reading target of image information of the image reading device according to Embodiment 1. In the illuminating device (image reading device), the longitudinal direction (main scanning direction) and the transverse direction (sub-scanning direction) intersect each other and preferably are perpendicular to each other. The direction intersecting each of the longitudinal direction (main scanning direction) and the traverse direction (sub-scanning direction) is a height direction of the illumination device and the image reading device. The height direction is preferably perpendicular to the longitudinal direction (main scanning direction) and the transverse direction (sub-scanning direction). An optical axis direction along an optical axis of a lens body 10 described later corresponds to the height direction. The optical axis direction (height direction), in a case in which a mirror is used instead of the lens body 10 to fold back the optical axis, is an optical axis ranging up to the mirror that first reflects light from the illumination target 1 (reading target 1). In the present disclosure, a device including, as an imaging optical system, an erecting unit-magnification optical system and not having a configuration in which the optical axis is folded back by a mirror is described as an example. In the drawings, the longitudinal direction (main scanning direction) is indicated as the X-axis direction, the transverse direction (sub-scanning direction) is indicated as the Y-axis direction, and the height direction (optical axis direction) is indicated as the Z-axis direction. In the drawings, the illumination device (image reading device) is illustrated in a case in which the three axes of the X axis, the Y axis, and the Z axis are perpendicular to one another.

In FIGS. 1A to 8, a light guide 2 is a rod-shaped transparent body made of resin or the like. The light guide 2 extends in the longitudinal direction (main scanning direction), guides light entering from an end surface 2a, and emits linear light from a lateral surface 2b. The light guide 2 has a light scattering pattern 2c formed in a portion facing the lateral surface 2b. Although FIG. 1A illustrates a case in which a single light guide 2 is provided and FIG. 1B illustrates a case in which two light guides 2 are provided, the number of light guides 2 is not limited to these cases. One or more light guides 2 is to be used. The light guide holding portion 3 preferably includes a light guide insertion portion 4 (light guide holder 4) and a light source base plate 5.

In FIGS. 1A to 8, the light guide insertion portion 4 (light guide holder 4) has holes 4a into which the end surface of the light guide 2 is inserted. Also, the light guide insertion portion 4 (light guide holder 4) has openings 4b formed on a surface opposite to the surface into which the end surface of the light guide 2 is inserted, and the openings 4b optically communicates with the holes 4a. The holes 4a and the openings 4b are to be formed in accordance with the number of the light guides 2. In a case in which the light source base plate 5 is formed on the light guide holding portion 3, a light source, that is arranged on the side of the light guide insertion portion 4 opposite to the surface into which the end surface of the light guide 2 is inserted and emits light through the hole 3a, is formed on the light source base plate 5.

The light source formed on the light source base plate 5 is preferably an element such as an LED or an organic EL element. For example, a component emitting red light (R), green light (G), blue light (B), white light (H), ultraviolet light (UV), infrared light (IR) or the like in accordance with image information of the illumination target 1 (reading target 1) is used as the light source. The light source may or may not be disposed inside of the light guide insertion portion 4 through the opening 3b. In other words, an arrangement is sufficient that causes the light emitted from the light source to enter the end surface 2a of the light guide 2 through the inside of the light guide insertion portion 4. The light source is connected to a sensor board 11 described later by a power supply line 5a (cable 5a). A flexible board 5a is preferably used as the power supply line 5a. Since the sensor board 11 also has a function of supplying power to the light source (light source base plate 5) to control light-emitting operation of the light source, the sensor board 11 can also be said to be a light source control board 11. In the illumination device according to the present disclosure, the light source control board 11 may be provided at the exterior. Also, the light source base plate 5 may be made to have the function of the light source control board 11.

In FIGS. 1 to 8, the supporter 6 supports the light guide holding portion 3 slidably along the longitudinal direction. The supporter 6 has surfaces extending in the longitudinal direction from both ends, in the transverse direction, of the surface extending in the transverse direction. That is, in the shape of the supporter 6, a cross section on which the longitudinal direction and the transverse direction intersect with each other is an angular C-shaped cross section. The housing 7 supports or houses the light guide 2, the light guide holding portion 3, and the supporter 6 and at least the supporter 6 is fixed to the housing 7. Specifically, a direction in which the light guide holding portion 3 slides is restricted to the longitudinal direction by a supporter-side concave-convex portion 8 that is a supporter-side groove portion 8a or a supporter-side protruding portion 8b, at least one of which is formed on the supporter 6 along the longitudinal direction. Further, the light guide holding portion 3 has a light guide holding portion-side concave-convex portion 9 that (i) has a shape corresponding to a shape of the supporter-side concave-convex portion 8 and (ii) is formed along the longitudinal direction. The light guide holding portion-side concave-convex portion 9 is formed on at least one of the light guide insertion portion 4 (light guide holder 4) or the light source base plate 5. The present disclosure provides, as an example, a case in which the light guide holding portion-side concave-convex portion 9 is formed only in the light guide insertion portion 4 (light guide holder 4).

In FIG. 1B and FIGS. 2 to 8, the lens body 10 focuses rays passing through the reading target 1 among rays of the linear light emitted from the lateral surface of the light guide 2, and the present disclosure provides, as an example, a case in which the lens body 10 is a rod lens array 10 in which rod lenses are arranged in an array in the main scanning direction (longitudinal direction). In this case, the phrase, "focuses rays passing through the reading target 1", means at least one of the phrase "focuses rays reflected by the reading target 1" or the phrase "focuses rays transmitted through the reading target 1". The lens body 10 may be a microlens array of an erecting unit-magnification optical system like the rod lens array 10 or a lens of a reducing optical system. Also, the entirety of components including an optical element such as a mirror that folds back the optical path may be referred to as the lens body 10.

In FIG. 1B and FIGS. 2 to 8, sensor elements 12 that receive rays focused by the lens body 10 are formed on the sensor board 11. As described above, the sensor board 11 may have a function (light source control board 11) to supply power to the light source (light source base plate 5) and a function to control light-emitting operation of the light source. Also, the sensor board 11 may also serve as a signal processing board 11. The sensor board 11 includes the sensor elements 12 arranged in an array along the longitudinal direction. However, sensor boards for the present disclosure are not limited to such a sensor board 11. Further, the sensor elements 12 may be arranged in an array along the longitudinal direction in rows, and the sensor elements 12 arranged in rows may be staggered.

In addition to the sensor elements 12 (sensor element array 12), the sensor board 11 is provided with an external connector and electronic components such as a signal processing IC (application specific integrated circuit (ASIC)) that perform functions of the signal processing board 11. The signal processing IC may be provided on a board different from the sensor board 11 as described above. Such a signal processing IC (ASIC) processes, in cooperation with a central processing unit (CPU) and a random-access memory (RAM), signals such as photoelectric conversion outputs of the sensor elements 12 (sensor element array 12) that receive light. The CPU, the RAM and the signal processing circuit of the ASIC are collectively referred to as a signal processor. The sensor board 11 is arranged such that an optical axis of the lens body 10 (rod lens array 10) is aligned with light receiving portions of the sensor elements 12 (sensor element array 12). The external connector formed on the sensor board 11 is used for an input/output signal interface including the photoelectric conversion outputs of the sensor elements 12 and signal processing outputs thereof.

For example, in FIG. 1B, the lens body 10 and the sensor board 11 are held by the housing 7, and the sensor board 11 is arranged on the side of the light guide 2 opposite to the reading target 1. That is, an example is illustrated in which the lens body 10 focuses reflected light that is light emitted from the light guide 2 and reflected by the reading target 1. Of course, the present disclosure is also applicable to an image reading device in which the lens body 10 focuses transmitted light that is light emitted from the light guide 2 and transmitted through the reading target 1. That is, providing a non-illustrated second housing that holds the lens body 10 and the sensor board 11 is sufficient, and arrangement of the second housing and the housing 7 (first housing 7) with the reading target 1 (conveyance path) therebetween is sufficient. In this case, the power supply line 5a (flexible board 5a) may be connected to the sensor board 11 of the second housing from the light source base plate 5 housed in the housing 7 (first housing 7) or may be connected to the light source control board 11 on the housing 7 (first housing 7)-side.

Although the top plate (cover glass) is not illustrated between the illumination device or the image reading device (housing 7) according to Embodiment 1 and the illumination target 1 (reading target 1), preparation of the top plate on a product into which the illumination device or the image reading device according to Embodiment 1 is incorporated is sufficient. Of course, the illumination device or the image reading device according to Embodiment 1 may have a structure in which the top plate can be directly provided for the housing 7. That is, in the illumination device or the image reading device according to Embodiment 1, restriction of the direction of sliding of the light guide holding portion 3 (light guide holder 4) to the longitudinal direction by the supporter 6 (supporter-side concave-convex portion 8), regardless of the presence or absence of the top plate, is sufficient.

Figure 7:
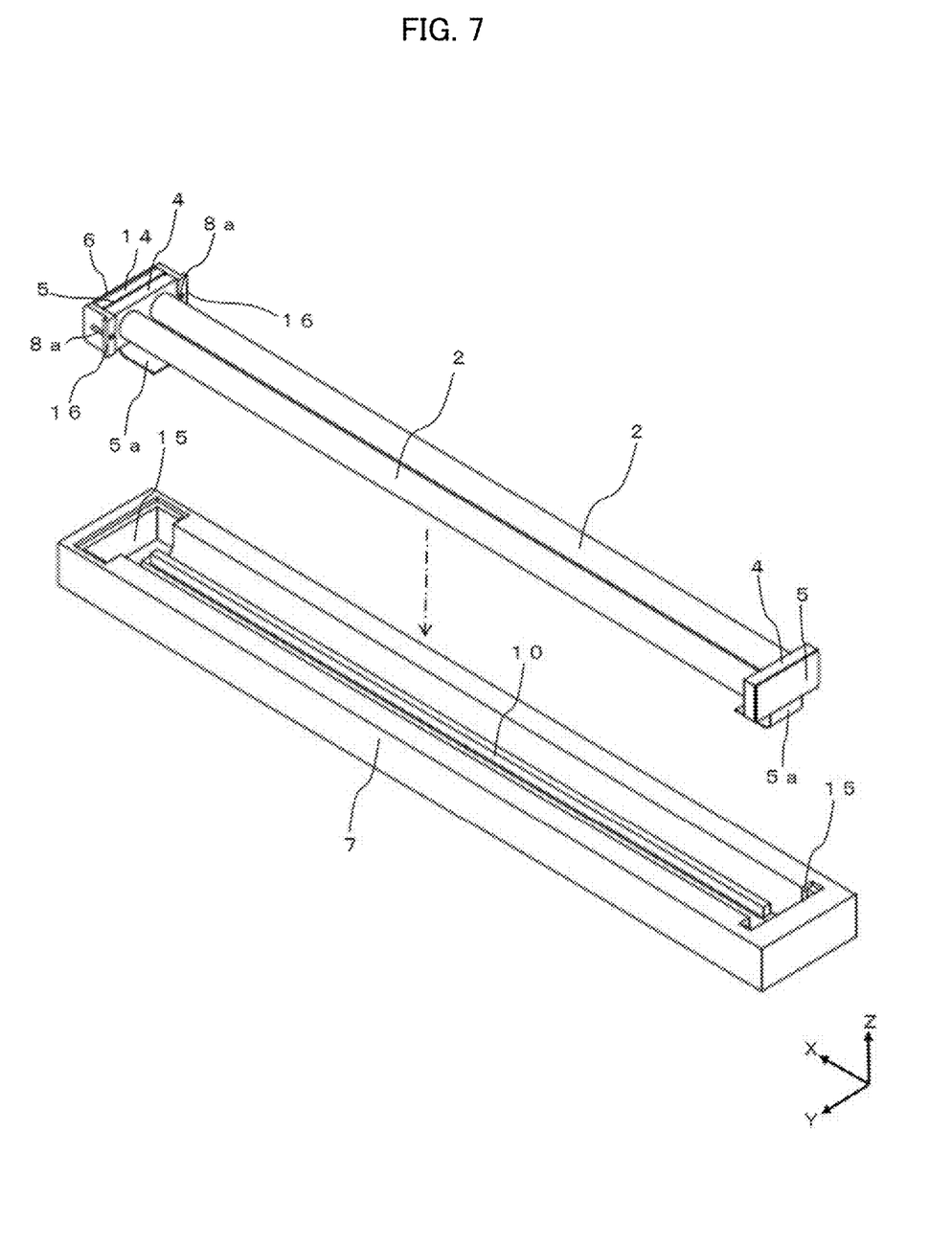
FIG. 7 is a drawing illustrating a process of assembly of the image reading device according to Embodiment 1 (a process of inserting the supporter, the light guide holding portion, the light source base plate and the light guide into the housing)
Figure 8:
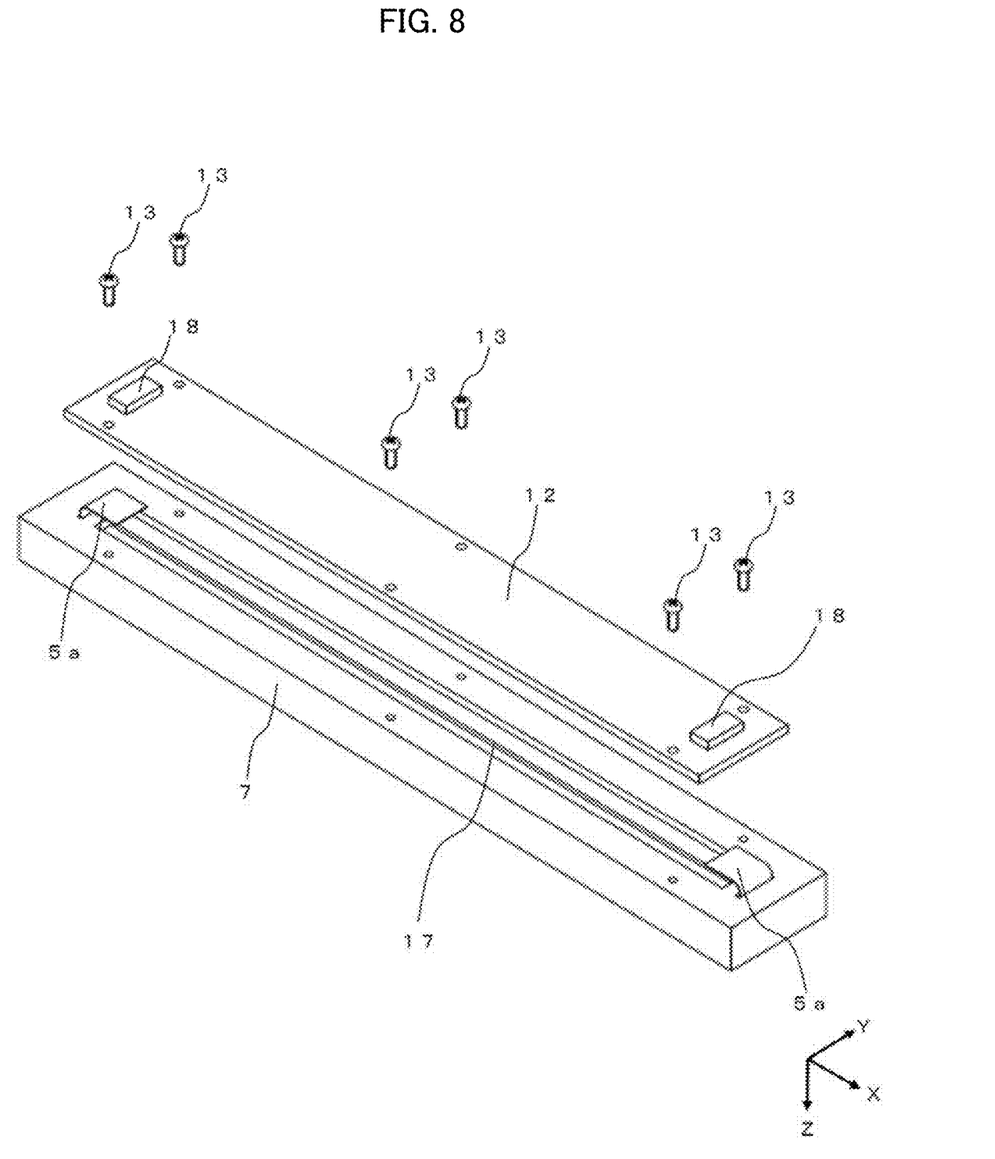
FIG. 8 is a drawing illustrating a process of assembly of the image reading device according to Embodiment 1 (a process of mounting a sensor board to the housing)

In FIGS. 1A to 8, using at least one of the light guide holding portion-side groove portion 9a or the light guide holding portion-side protruding portion 9b as the light guide holding portion-side concave-convex portion 9 is sufficient. FIGS. 2 to 8 illustrate a case in which the light guide holding portion-side concave-convex portion 9 is the light guide holding portion-side protruding portion 9b. Similarly, FIGS. 2 to 8 illustrate a case in which the supporter-side concave-convex portion 8 is the supporter-side groove portion 8a. In this case, although the opening penetrating the supporter 6 is illustrated as an example of the supporter-side groove portion 8a, the supporter-side groove portion 8a may be formed in which a housing 7-side is non-penetrated. A later-described structure (shape) as illustrated in FIG. 9F can be considered as a structure (shape) of the closed recessed supporter-side groove portion 8a. FIGS. 2 to 8 illustrate the supporter 6 including the two supporter-side concave-convex portions 8 formed to face each other with the light guide holding portion 3 (at least the light guide holding portion-side concave-convex portion 9) arranged therebetween. Similarly, FIGS. 2 to 8 illustrate the light guide holding portion 3 including the two light guide holding portion-side concave-convex portions 9 formed to face each other with the holes 4a (openings 4b) formed therebetween.

In FIGS. 2 to 8, the holes 4a (openings 4b) is arranged on an imaginary line connecting the two light guide holding portion-side concave-convex portions 9. Although the holes 4a (openings 4b) does not necessarily have to be formed on an imaginary line connecting the two light guide holding portion-side concave-convex portions 9, if the holes 4a (openings 4b) is formed at a position offset from the imaginary line, the light guide holding portion 3 may be increased in size. In other words, when the holes 4a (openings 4b) is formed along the imaginary line, the light guide holding portion 3 may be capable of being downsized in some cases. Also, at least one of the supporter-side concave-convex portions 8 or the light guide holding portion-side concave-convex portions 9 come into contact with the housing 7. Specifically, the end portions of the supporter-side concave-convex portions 8 or the light guide holding portion-side concave-convex portions 9 on the light guide 2-side in the longitudinal direction come into contact with the housing 7.

The illumination device and the image reading device according to Embodiment 1 are described in more detail with reference to FIGS. 1 to 3. The illumination device according to Embodiment 1 includes the light guide 2, the light guide holding portion 3, the supporter 6, and the housing 7. The cross-sectional view in the sub-scanning direction illustrated in FIG. 1A is a view of the illumination device according to Embodiment 1. The light source control board 11 is also illustrated in FIG. 1A. Since the image reading device according to Embodiment 1 includes the lens body 10 and the sensor board 11 (light source control board 11) in addition to the light guide 2, the light guide holding portion 3, the supporter 6, and the housing 7, in FIG. 1B, components other than the lens body 10 and the sensor board 11 can be said to correspond to the illumination device according to Embodiment 1. The illumination device according to Embodiment 1 may include the sensor board 11 as the light source control board 11. For simplification, in FIG. 2 and beyond, drawings illustrating only the illumination device are omitted and the image reading device is mainly illustrated.

The light scattering pattern 2c on the light guide 2 is an uneven one that extends in the longitudinal direction and is formed on a surface of the light guide 2, for example, as a fine uneven surface or an embossed surface. Also, the light scattering pattern 2c formed on the light guide 2 may be a white paint or the like formed on the surface of the light guide 2 along the longitudinal direction. For example, formation may be by silk screen printing. Such a light scattering pattern 2c reflects and scatters light propagating (guided) inside the light guide 2, and linear light is emitted from the lateral surface 2b to the illumination target 1 (reading target 1). Also, the light guide 2 changes a direction of propagation of light by reflecting or refracting the light entering from the end surface 2a to transmit (guide) the light in the longitudinal direction inside of the light guide 2.

Figure 2:
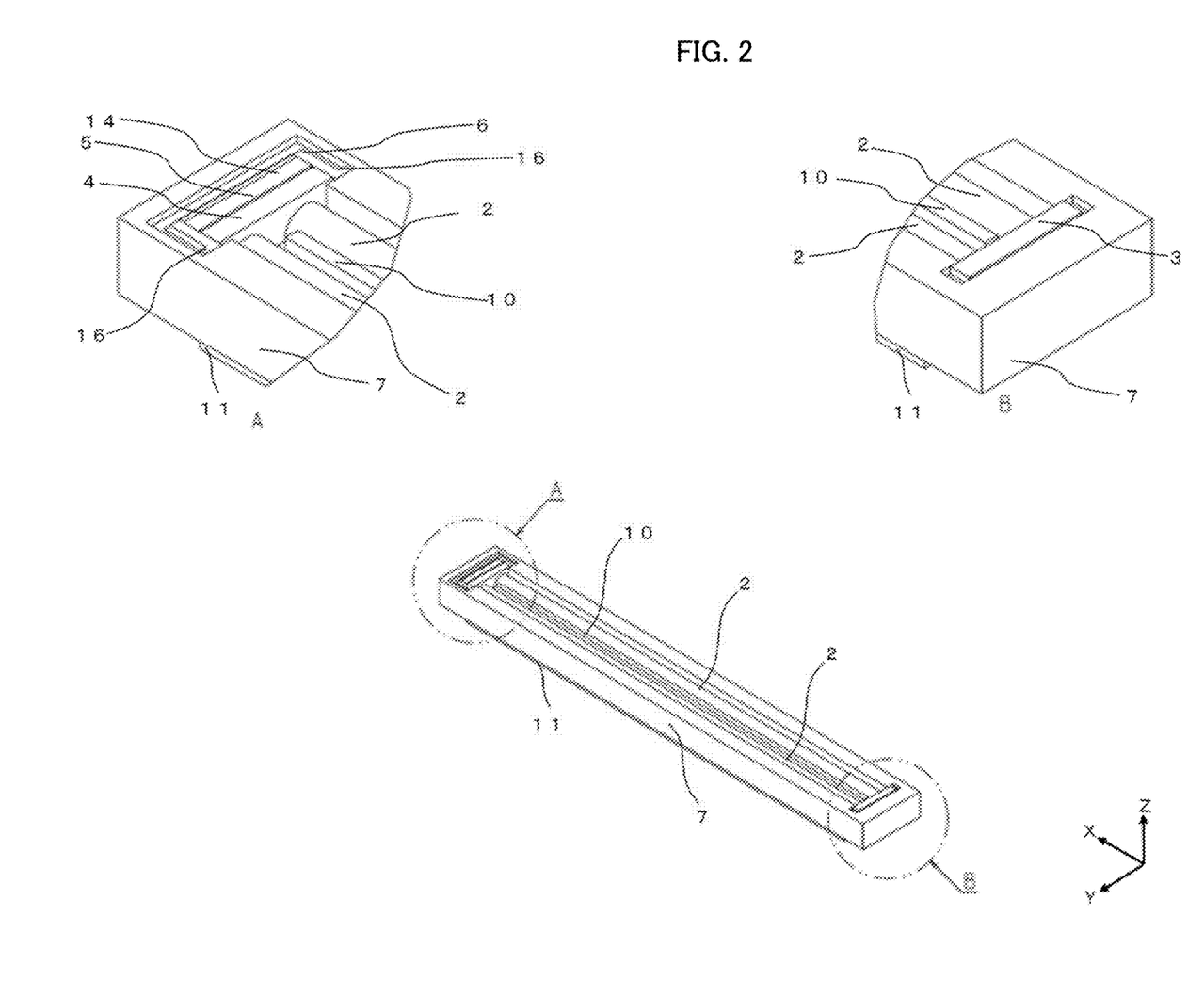
FIG. 2 is a perspective view and partially enlarged views of the image reading device according to Embodiment 1.
Figure 3:
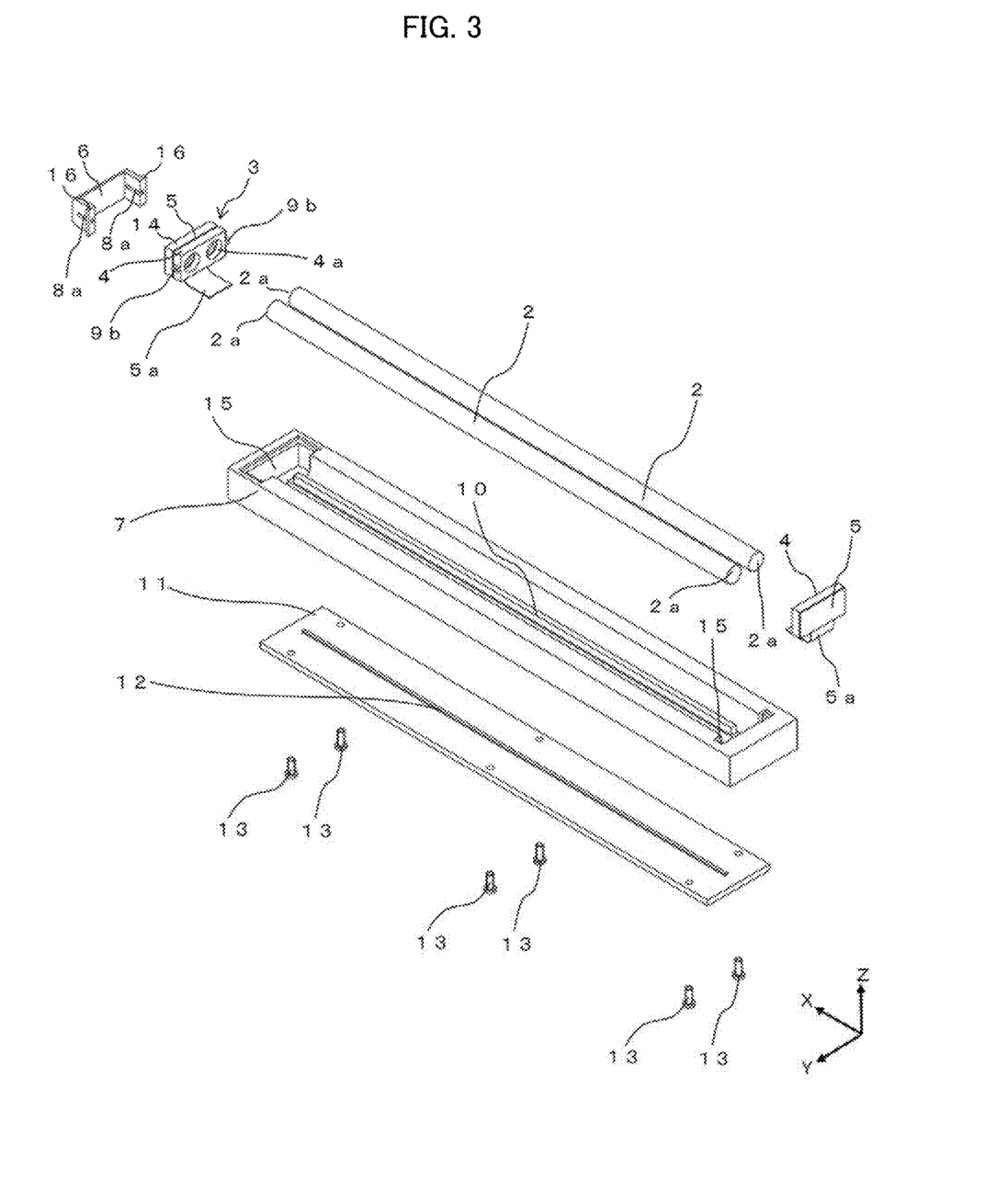
FIG. 3 is an exploded perspective view of a supporter, a light guide holding portion, and a light guide of the image reading device according to Embodiment 1.
Figure 4:
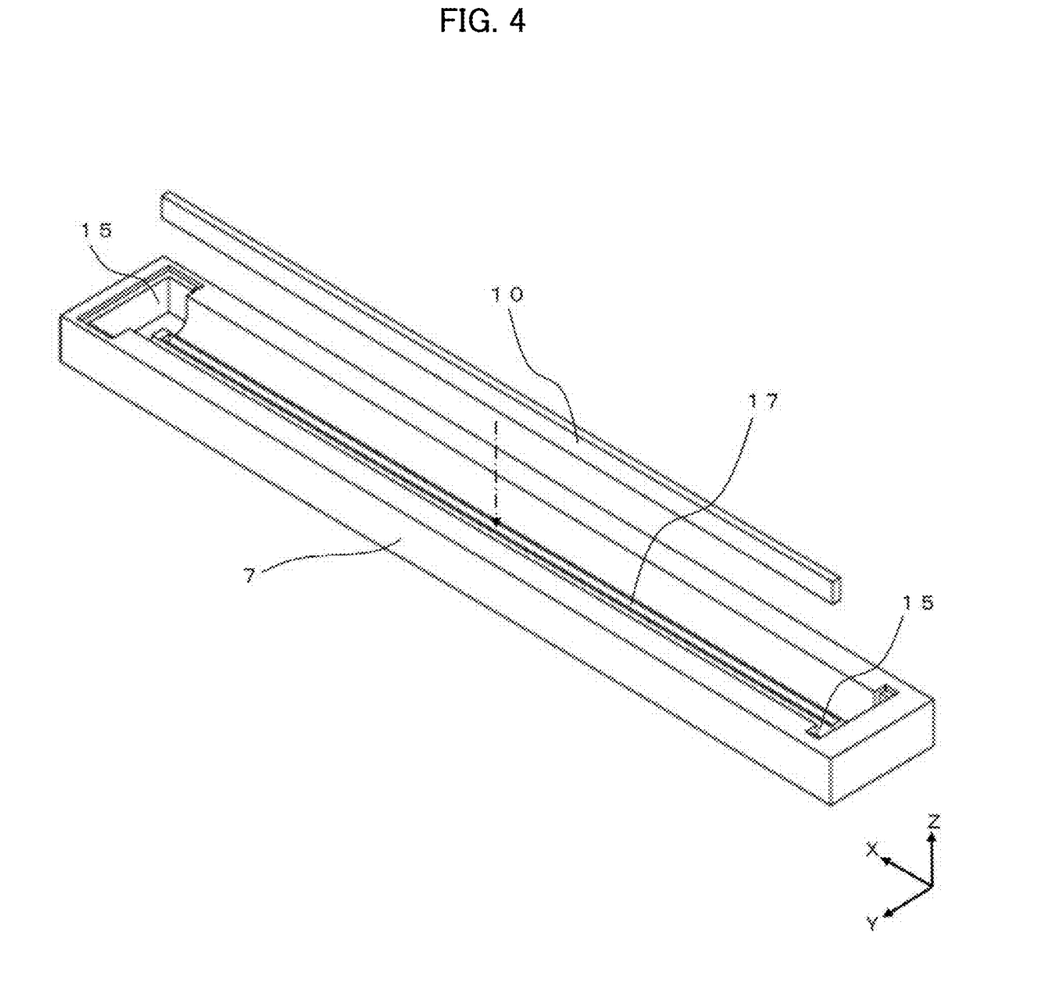
FIG. 4 is a drawing illustrating a process of assembly of the image reading device according to Embodiment 1 (a process of inserting a lens body into a housing)

FIG. 2 is a perspective view and partially enlarged views of the image reading device. FIG. 3 is an exploded perspective view of the light guide holding portion 3 and the light guide 2 of the image reading device. As illustrated in the drawings, the sensor board 11 is fixed to the housing 7 by screws 13 inserted through screw holes formed in a peripheral edge of the sensor board 11.

An elastic body 14 is arranged between the light guide holding portion 3 and the supporter 6 in the longitudinal direction and restricts a range of sliding of the light guide holding portion 3 in the longitudinal direction. When temperature around the light guide 2 changes, relative positions of the light guide 2 and each component change due to a difference in linear expansion between the light guide 2 and each component. In the image reading device and the illumination device for the image reading device, the positional relationship between the light source and the light guide 2 has a great influence on performance of these devices. Accordingly, the light guide 2 is fixed in the height direction, and a change in dimension of the light guide 2 in the longitudinal direction is to be allowed. When the elastic body 14 is used, even in a case in which the length of the light guide 2 in the longitudinal direction changes due to expansion or contraction of the light guide 2, the elastic body 14 deforms in accordance with the expansion or contraction, so that the light guide 2 can be fixed. The elastic body 14 may be formed as a part of the light guide holding portion 3, and the light guide holding portion-side concave-convex portion may be formed on at least one of the light guide insertion portion 4, the light source base plate 5, or the elastic body 14.

In the housing 7, at least the light guide holding portion 3 and the supporter 6 are, or only the light guide holding portion 3 is, to be supported by or housed in a recessed concave portion 15 along the height direction that is a direction perpendicular to an imaginary plane on which the longitudinal direction intersects with a facing direction (transverse direction) in which the two supporter-side concave-convex portions 8 face each other. Engaging portions 16 are formed along the height direction, project from the supporter 6 on the side of the supporter 6 opposite to the side on which the light guide holding portion 3 is arranged, and come into contact with the concave portion 15. The supporter 6 having the engaging portions 16 has surfaces extending in the longitudinal direction from both the end portions, in the transverse direction, of the surface extending in the transverse direction; the engaging portions 16 are provided at the end portions of these surfaces; and the engaging portions 16 can be said to be surfaces extending in the transverse direction. That is, the shape of the supporter 6 is a shape obtained by bending the end portions of a C-shaped curve having an angular C shape outward on the cross section on which the longitudinal direction and the transverse direction intersect with each other. In other words, the shape of the supporter 6 is an angular Ω-like shape on the cross section on which the longitudinal direction and the transverse direction intersect with each other.

The present disclosure provides, as an example, a case in which light guide holding portions 3 are provided on both end portions (end surfaces) of the light guide 2. Also, the present disclosure provides, as an example, a case in which the supporter 6 is provided on one end portion (end surface)-side of the light guide 2 (portion A in FIG. 2), and the supporter 6 is not provided on the other end portion (end surface)-side of the light guide 2 (portion B in FIG. 2). However, the supporter 6 may be provided on both of the end portion (end surface)-sides of the light guide 2. Additionally, although the present disclosure provides, as an example, a case in which the light source base plates 5 (light sources) are provided on both the end portions (end surfaces) of the light guide 2, such provision may be on only one end portion. That is, one of the light guide holding portions 3 having at least the holes 4a is sufficient, and the light source base plate 5 may be omitted. Of course, the supporter 6 may be arranged on the light guide holding portion 3-side that is not provided with the light source base plate 5.

That is, the illumination device and the image reading device according to Embodiment 1 can be said to be characterized in that (i) the illumination device and the image reading device include: a rod-shaped light guide 2 extending in the longitudinal direction and configured to guide light entering from the outside and emit the light as linear light from the lateral surface; the light guide holding portion 3 (light guide holder 4) having the holes 4a into which the end surface of the light guide 2 is inserted; the supporter 6 supporting the light guide holding portion 3 (light guide holder 4) slidably along the longitudinal direction; and the housing supporting or housing the light guide 2, the light guide holding portion 3 (light guide holder 4) and the supporter 6, at least the supporter 6 being fixed to the housing, and (ii) the direction of sliding of the light guide holding portion 3 (light guide holder 4) is restricted to the longitudinal direction by the supporter-side concave-convex portion 8 that is the supporter-side groove portion 8a or the supporter-side protruding portion 8b at least one of which is formed on the supporter 6 along the longitudinal direction.

With reference to FIGS. 4 to 8, a method of assembling the illumination device and the image reading device according to Embodiment 1 is described in addition to the configurations of the illumination device and the image reading device according to Embodiment 1. The lens body 10 is inserted into a lens body supporting hole 17 of the housing 7 in the direction of an arrow illustrated by a dashed-dotted line in FIG. 4. The lens body supporting hole 17 is formed to be a hole making the reading target 1-side communicate with the sensor board 11-side, for example, so as to enable light focused by the lens body 10 to form images on the sensor elements 12 while the lens body supporting hole 17 supports the lens body 10 as illustrated in FIG. 1B. The lens body 10 is inserted into and fixed to the lens body supporting hole 17, thereby closing the lens body supporting hole 17. As a result, the fixing of the lens body 10 to the lens body supporting hole 17 contributes to structural dustproofness of the sensor elements 12. Fixing the lens body 10 to the lens body supporting hole 17 may be performed, for example, by filling a space between the hole 17 and the lens body 10 with resin (by applying resin). A black resin is preferable for this filling (application) and contributes to the blocking of unnecessary light. Also, the housing 7 is also provided with recesses for housing the light guide 2 that are formed before and behind the lens body supporting hole 17 in the transverse direction.

Figure 5:
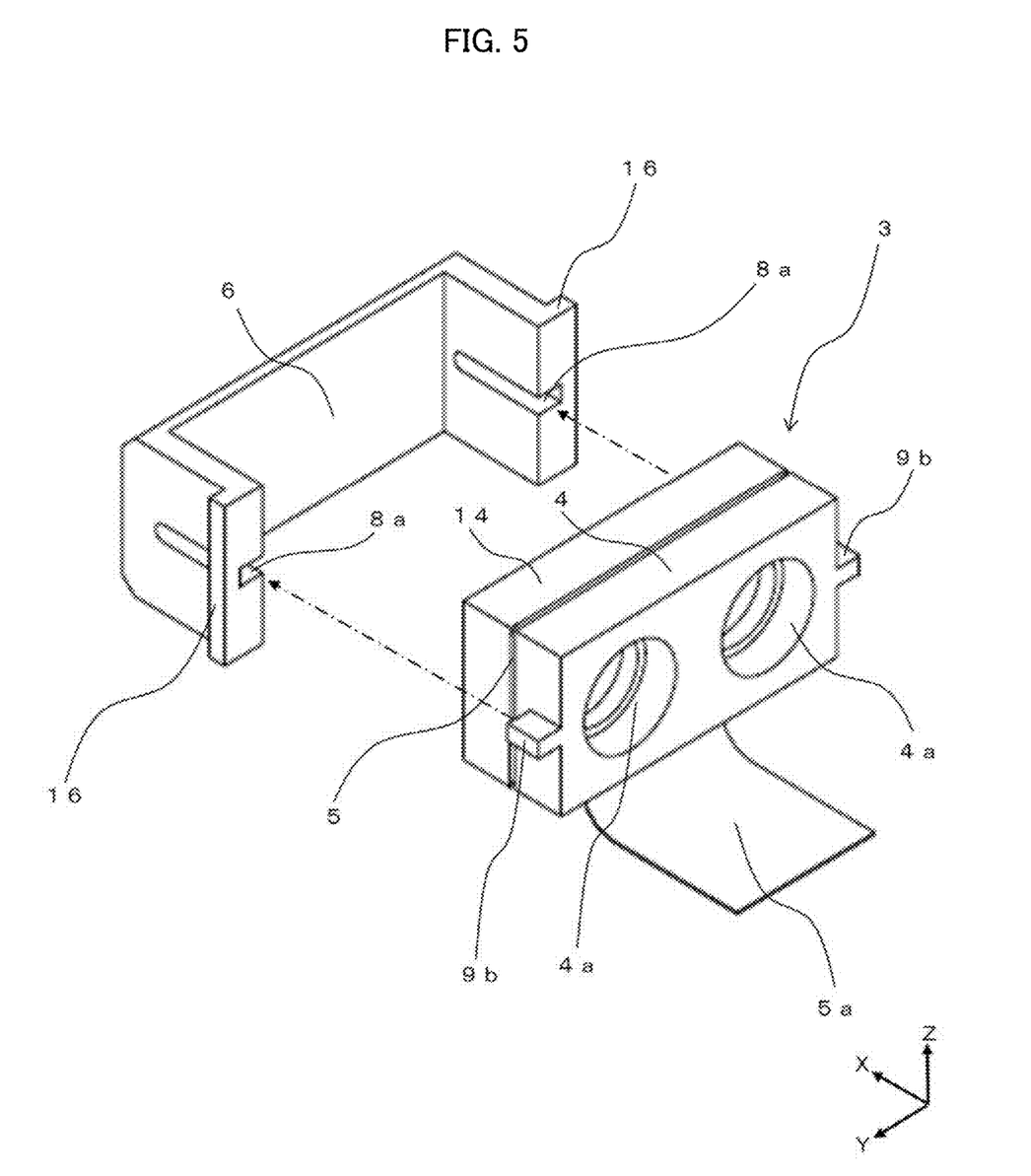
FIG. 5 is a drawing illustrating a process of assembly of the image reading device according to Embodiment 1 (the supporter, the light guide holding portion and a light source base plate)
Figure 6:
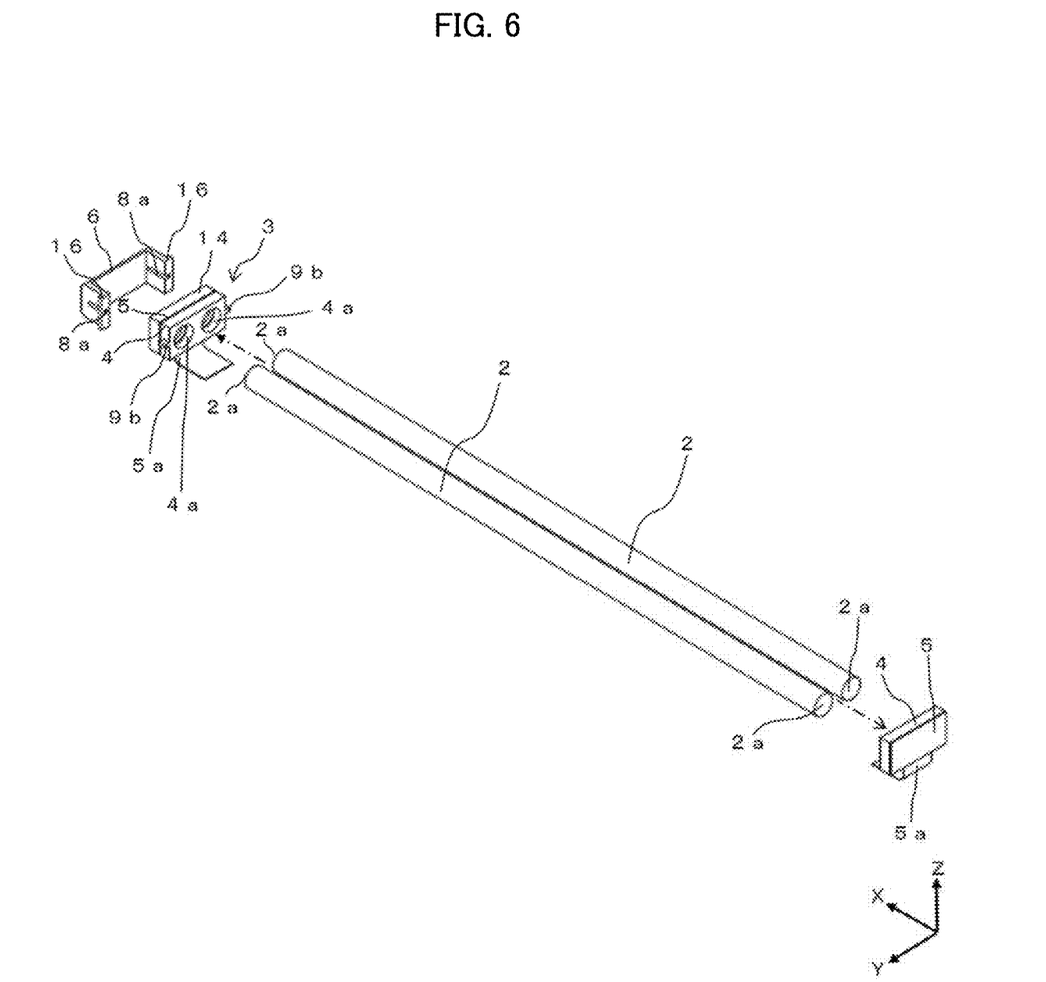
FIG. 6 is a drawing illustrating a process of assembly of the image reading device according to Embodiment 1 (the supporter, the light guide holding portion, the light source base plate and the light guide)

FIG. 5 is a drawing illustrating a positional relationship between the light guide holding portion 3 and the supporter 6 before assembly. The light guide holding portion-side protruding portion 9b (light guide holding portion-side concave-convex portion 9) of the light guide holding portion 3 is inserted into the supporter-side groove portion 8a (supporter-side concave-convex portion 8) of the supporter 6 in the direction of an arrow illustrated by a dashed-dotted line in FIG. 5. The supporter-side groove portions 8a are formed on the surfaces extending in the longitudinal direction from both the end portions, in the transverse direction, of the surface of the supporter 6 extending in the transverse direction. The relationship between the supporter-side concave-convex portion 8 and the light guide holding portion-side concave-convex portion 9 does not require constant contact between the concave-convex portions 8 and 9, and restriction of the direction in which the light guide holding portion 3 is slidable to the longitudinal direction is sufficient. Accordingly, play may occur to some extent between the supporter-side concave-convex portion 8 and the light guide holding portion-side concave-convex portion 9. Of course, the supporter-side concave-convex portion 8 and the light guide holding portion-side concave-convex portion 9 may be configured to always come into contact with each other. In this case, the supporter-side concave-convex portion 8 and the light guide holding portion-side concave-convex portion 9 can be said to be a supporter-side contact portion 8 and a light guide holding portion-side contact portion 9. FIG. 6 is a drawing illustrating positional relationships between the light guide 2, the light guide holding portion 3 and the supporter 6 before assembly. In addition to the state described with reference to FIG. 5, the light guide 2 is inserted into the light guide holding portion 3 in the direction of an arrow illustrated by a dashed-dotted line in FIG. 6.

The light guide 2, the light guide holding portion 3, and the supporter 6 for which the assembly method is described in FIGS. 5 and 6 are inserted into the housing 7 in the direction of an arrow illustrated by a dashed-dotted line in FIG. 7. Since the supporter 6 is to support the light guide holding portion 3 with the light guide holding portion 3 exposed in the imaginary plane on which the longitudinal direction intersects with the facing direction in which the two supporter-side concave-convex portions 8 face each other, an increase of the size of the image reading device (illumination device) in the height direction can be avoided (refer to the portion A in FIG. 2). In addition, a hole for passing the power supply line 5a to the sensor board 11-side of the housing 7 is formed on a portion of the concave portion 15 of the housing 7. FIG. 8 illustrates the power supply line 5a led to the sensor board 11-side of the housing 7 through the hole.

The supporter 6 is easily inserted by inserting the supporter 6 into the concave portion 15 while only the engaging portions 16 come into contact with the concave portion 15. Also, a C-shaped space (excluding the supporter-side groove portion 8a in the case of opening), that opens only in the height direction, is formed between the supporter 6 and the housing 7 due to existence of the engaging portions 16 after the insertion. Accordingly, when this space is filled with resin (resin is applied to this space) when the supporter 6 is fixed to the housing 7 with the resin after the insertion, the resin does not easily flow around to the light guide holding portion 3-side. Due to such operation, sliding of the light guide holding portion 3 in the longitudinal direction can be easily maintained. Also, the resin does not easily flow into the hole for leading of the power supply line 5a to the sensor board 11-side of the housing 7. Of course, in the case in which the supporter-side groove portion 8a is an opening penetrating the supporter 6, the supporter portion 6 is to be fixed to the housing 7 with resin having an amount such that resin height is equal to or lower than the height of a position of the opening.

Although FIG. 8 illustrates the sensor board 11 that is not yet attached to the housing 7 by the screw 13, the sensor board 11 may be attached to the housing 7 before the power supply line 5a is drawn out. Eventual connection of the connector 18 formed on the sensor board 11 (light source control board 11) to the power supply line 5a is sufficient. The connector 18 is illustrated, as an example, that is formed on the surface of the sensor board 11 opposite to the surface on which the sensor elements 12 are formed. As illustrated the drawing, when the sensor board 11 whose length in the longitudinal direction is shorter than that of the housing 7 is used, a compact connection structure is easily achievable between the connector 18 and the power supply line 5a.

In the illumination device and the image reading device according to Embodiment 1, the light guide holding portion 3 is movable in the longitudinal direction by the supporter 6. Also, the light guide holding portion makes the light guide immovable in the height direction by the supporter 6 (including a case in which the movement is limited), thereby enabling achievement of a structure in which the light guide 2 is movable in the longitudinal direction and does not move in the height direction (including the case in which movement is limited). The case in which the movement is limited means a case in which the light guide holding portion 3 makes the light guide 2 immovable in the height direction and the light guide 2 in the longitudinal direction is immovable in the fixed portion, that is, a portion that touches the light guide holding portion 3.

Embodiment 2

An illumination device and an image reading device according to Embodiment 2 are described with reference to FIGS. 9A to 9F. Descriptions of components common to Embodiments 1 and 2 are sometimes omitted. FIGS. 9A to 9E are simplified cross-sectional views, along the sub-scanning direction, of the supporter and the light guide holding portion of the illumination device and the image reading device according to Embodiment 2. FIG. 9F is a simplified cross-sectional view, along the sub-scanning direction, of the supporter and the light guide holding portion of the illumination device and the image reading device according to Embodiment 1, and is used for comparison of the structures of Embodiments 1 and 2. FIGS. 9A to 9F illustrate a cross section on which the transverse direction and the height direction intersect with each other. The light guide holding portion 3 indicates any one of the light guide insertion portion 4, the light source base plate 5 or the elastic body 14. Accordingly, in the simplified cross-sectional view of the light guide insertion portion 4, illustration of the holes 4a is omitted, and in the simplified cross-sectional view of the light source base plate 5, illustration of configuration of the base plate is omitted. Components that are the same or equivalent are assigned the same reference signs throughout the drawings, and detailed descriptions of such components are omitted.

In the illumination device and the image reading device according to Embodiment 1, the two supporter-side concave-convex portions 8 (supporter-side contact portions 8) are the supporter-side groove portions 8a, and the two light guide holding portion-side concave-convex portions 9 (light guide holding portion-side contact portions 9) are the light guide holding portion-side protruding portions 9b. However, as described above, the supporter-side protruding portions 8b and the light guide holding portion-side groove portions 9a may be respectively used as supporter-side concave-convex portions 8 (supporter-side contact portions 8) and the light guide holding portion-side concave-convex portions 9 (light guide holding portion-side contact portions 9).

Figure 9A:
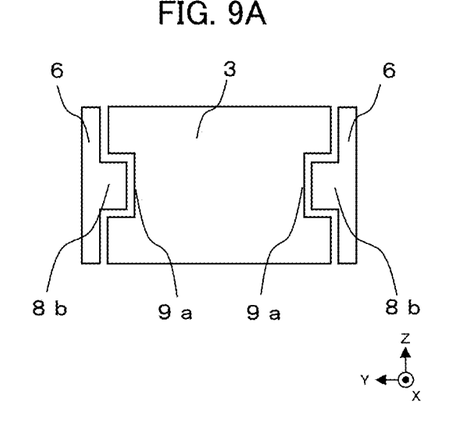
FIG. 9A is a simplified cross-sectional view of a supporter and a light guide holding portion of an illumination devices and an image reading devices according to Embodiment 2.
Figure 9B:
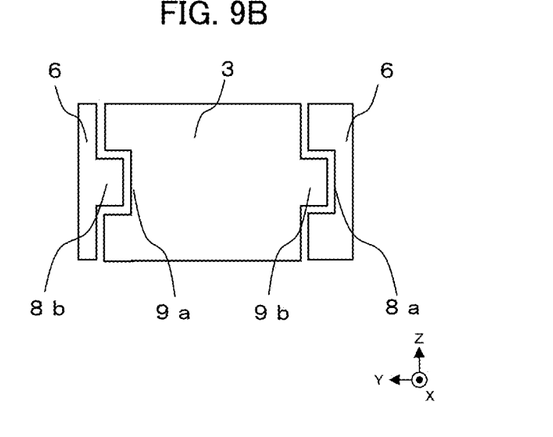
FIG. 9B is a simplified cross-sectional view of another supporter and another light guide holding portion of the illumination devices and the image reading devices according to Embodiment 2.

In FIG. 9A, the two supporter-side concave-convex portions 8 (supporter-side contact portions 8) are the supporter-side protruding portions 8b, and the two light guide holding portion-side concave-convex portions 9 (light guide holding portion-side contact portions 9) are the light guide holding portion-side groove portions 9a. In this case, the light guide holding portion-side groove portions 9a can be said to be inserted into the supporter-side protruding portions 8b. FIG. 9B is a case in which one concave-convex portion 8 and one concave-convex portion 9 of FIG. 9A and one concave-convex portion 8 and one concave-convex portion 9 of FIG. 9F are used.

Figure 9C:
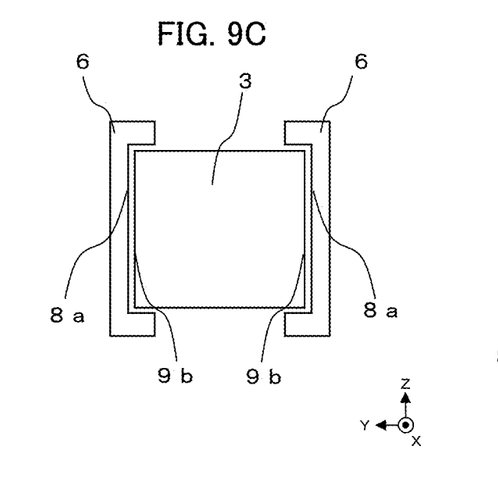
FIG. 9C is a simplified cross-sectional view of another supporter and another light guide holding portion of the illumination devices and the image reading devices according to Embodiment 2.
Figure 9D:
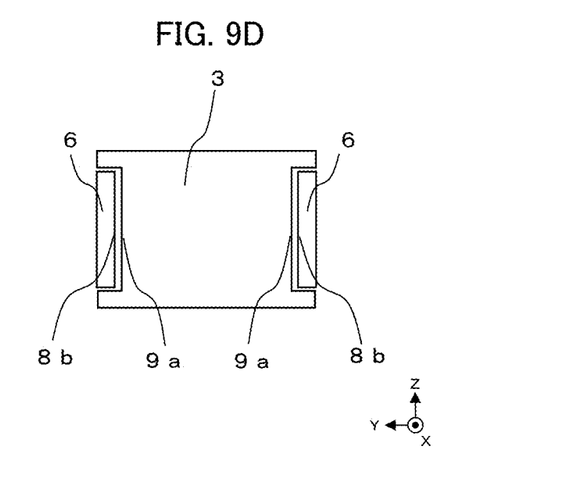
FIG. 9D is a simplified cross-sectional view of another supporter and another light guide holding portion of the illumination devices and the image reading devices according to Embodiment 2.
Figure 9E:
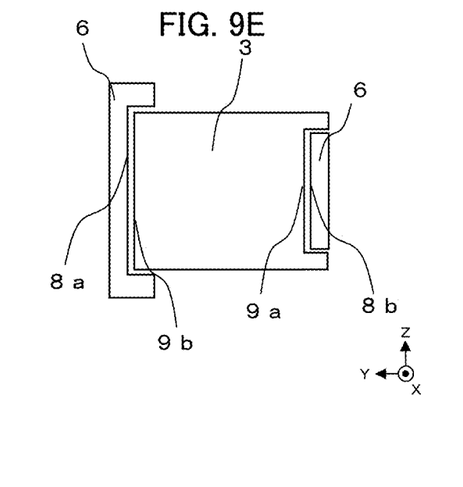
FIG. 9E is a simplified cross-sectional view of another supporter and another light guide holding portion of the illumination devices and the image reading devices according to Embodiment 2.
Figure 9F:
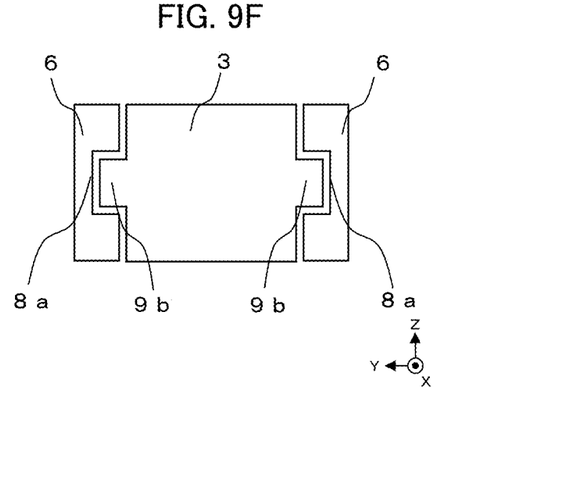
FIG. 9F is a simplified cross-sectional view of the supporter and the light guide holding portion of the illumination devices and the image reading devices according to Embodiment 1.

In FIG. 9C, the two supporter-side concave-convex portions 8 (supporter-side contact portions 8) are supporter-side groove portions 8a, and the two light guide holding portion-side concave-convex portions 9 (light guide holding portion-side contact portions 9) are the light guide holding portion-side protruding portions 9b, similarly to Embodiment 1 (FIG. 9F). The case of FIG. 9C is different from the case of FIG. 9F in that the light guide holding portion-side protruding portions 9b are formed on the entirety of the end portions of the light guide holding portion 3 in the transverse direction. Although the supporter 6 may be large as a result of such a configuration, a conventional shape of the light guide holding portion 3 is available. The light guide holding portion-side protruding portions 9b in this case are assumed to be also included in examples of the light guide holding portion-side concave-convex portions 9 for the sake of convenience.

In FIG. 9D, the two supporter-side concave-convex portions 8 (supporter-side contact portions 8) are the supporter-side protruding portions 8b, and the two light guide holding portion-side concave-convex portions 9 (the light guide holding portion-side contact portions 9) are the light guide holding portion-side groove portions 9a, as in FIG. 9A. A difference arises in that the supporter-side protruding portions 8b are formed on the entirety of the end portions of the light guide supporter 6 in the transverse direction. Also, the supporter-side protruding portions 8b in this case are assumed to be also included in examples of the supporter-side concave-convex portions 8 for convenience. FIG. 9E is a case in which one concave-convex portion 8 and one concave-convex portion 9 of FIG. 9C and one concave-convex portion 8 and one concave-convex portion 9 of FIG. 9D are used.

Although the elastic body 14 may be used in the illumination devices and the image reading devices according to Embodiments 1 and 2, there are other options for arrangement of the elastic body 14. The drawings used for the descriptions of Embodiments 1 and 2 illustrate a case in which the elastic body 14 is between the light source base plate 5 and the supporter 6. Alternatively, the elastic body 14 may be arranged between the light guide insertion portion 4 and the light source base plate 5 or between the housing 7 and the light guide insertion portion 4.

In the former case, the elastic body 14 is to have a structure that enables transmission of light from the light source. For example, a structure having a hole through which light passes is conceivable. In the latter case, the elastic body 14 is to have a structure that does not prevent the light guide insertion portion 4 from holding the light guide 2. For example, a structure having a hole through which the light guide 2 penetrates is conceivable. Also, when the elastic body 14 and the light source base plate 5 are brought into contact with each other, a material having a high heat conduction efficiency is used for the elastic body 14, thereby enabling contribution to heat dissipation of the light source base plate 5. Of course, a material having high heat conduction efficiency may be used for the supporter 6. An elastic member may be used for at least one of the supporter-side protruding portion 8b or the light guide holding portion-side protruding portion 9b to form, as the elastic body 14, the supporter-side protruding portion 8b itself or the light guide holding portion-side protruding portion 9b itself. Also, an elastic member may be used for at least either of the engaging portions 16 or the surface of the supporter 6 extending in the transverse direction, thereby forming, as the elastic body 14, the engaging portions 16 themselves or the surface of the supporter 6 extending in the transverse direction itself.

Also, although, as an example, the illumination devices and the image reading devices according to Embodiments 1 and 2 are described in which the supporter 6 is inserted into and fixed to the concave portion 15 of the housing 7, use of the concave portion 15 is optional as long as the supporter 6 is fixed and the light guide holding portion 3 is slidable. For example, operations such as forming a protrusion extending from the supporter 6 toward the housing 7-side in the height direction and inserting the protrusion into a hole of the housing 7 to fix the protrusion are conceivable. A so-called snap fit is preferable for the protrusion. In this case, the engaging portions 16 are not essential. Of course, the protrusion (snap fit) may be referred to as the engaging portion 16.

In the illumination devices and the image reading devices according to Embodiments 1 and 2, the light guide holder can be reliably supported, regardless of the presence or absence of the cover glass of the illumination devices (image reading devices), while the structure of the light guide holder is simplified.

REFERENCE SIGNS LIST

1 Illumination target (reading target)
2 Light guide
2a End surface
2b Lateral surface
2c Light scattering pattern
3 Light guide holding portion
4 Light guide insertion portion (light guide holder)
4a Hole
4b Opening
5 Light source base plate
5a Power supply line (cable, flexible board)
6 Supporter
7 Housing (first housing)
8 Supporter-side concave-convex portion (supporter-side contact portion)
8a Supporter-side groove portion
8b Supporter-side protruding portion
9 Light guide holding portion-side concave-convex portion (light guide holding portion-side contact portion)
9a Light guide holding portion-side groove portion
9b Light guide holding portion-side protruding portion
10 Lens body (rod lens array)
11 Sensor board (light source control board, signal processing board)
12 Sensor element (sensor element array)
13 Screw
14 Elastic body
15 Concave portion
16 Engaging portion
17 Lens body supporting hole
18 Connector

The invention claimed is:

1. An illumination device comprising:
a rod-shaped light guide extending in a longitudinal direction and configured to guide light entering from an exterior and emit the light as linear light from a lateral surface;
a light guide holding portion having a hole into which an end surface of the light guide is inserted;
a supporter supporting the light guide holding portion slidably along the longitudinal direction; and
a housing supporting or housing the light guide, the light guide holding portion, and the supporter, at least the supporter being fixed to the housing, wherein
a direction of sliding of the light guide holding portion is restricted to the longitudinal direction by a supporter-side concave-convex portion that is a supporter-side groove portion or a supporter-side protruding portion, at least one of the supporter-side groove portion or the supporter-side protruding portion being formed on the supporter along the longitudinal direction,
the supporter includes two of the supporter-side concave-convex portions facing each other, and the light guide holding portion is arranged between the two supporter-side concave-convex portions,
the supporter supports the light guide holding portion with the light guide holding portion exposed in an imaginary plane on which the longitudinal direction intersects with a facing direction in which the two supporter-side concave-convex portions face each other,
the housing includes a concave portion that is recessed along a height direction perpendicular to the imaginary plane and that supports or houses at least the light guide holding portion and the supporter, and
the illumination device further comprises an engaging portion that is formed along the height direction, projects from the supporter on a side of the supporter opposite to a side on which the light guide holding portion is arranged, and touches the concave portion.

2. The illumination device according to claim 1, wherein the light guide holding portion includes a light guide holding portion-side concave-convex portion that has a shape corresponding to a shape of the supporter-side concave-convex portion and that is formed along the longitudinal direction.

3. The illumination device according to claim 2, wherein the light guide holding portion-side concave-convex portion is at least one of a light guide holding portion-side groove portion or a light guide holding portion-side protruding portion.

4. The illumination device according to claim 3, wherein at least one of the supporter-side concave-convex portion or the light guide holding portion-side concave-convex portion touches the housing.

5. The illumination device according to claim 2, wherein at least one of the supporter-side concave-convex portion or the light guide holding portion-side concave-convex portion touches the housing.

6. The illumination device according to claim 1, further comprising an elastic body, wherein
the elastic body is arranged between the light guide holding portion and the supporter in the longitudinal direction and restricts a range of sliding of the light guide holding portion in the longitudinal direction.

7. An image reading device comprising:
the illumination device according to claim 1;
a lens body to focus rays passing through a reading target among rays of the linear light emitted from the lateral surface of the light guide; and
a sensor board including a sensor element to receive the rays focused by the lens body.

8. The image reading device according to claim 7, wherein
the housing holds the lens body and the sensor board.

9. The image reading device according to claim 7, wherein
the sensor board is arranged on a side of the light guide opposite to the reading target.

10. An illumination device comprising:
a rod-shaped light guide extending in a longitudinal direction and configured to guide light entering from an end surface and emit the light as linear light from a lateral surface;
a light guide holding portion having
a hole into which the end surface of the light guide is inserted,
a light guide insertion portion having an opening provided on an opposite surface opposite to a surface in which the end surface of the light guide is inserted, the opening optically communicating with the hole, and
a light source base plate that is arranged on the opposite surface-side and that includes a light source to emit light through the hole;
a supporter supporting the light guide holding portion slidably along the longitudinal direction; and
a housing supporting or housing the light guide, the light guide holding portion, and the supporter, at least the supporter being fixed to the housing, wherein
a direction of sliding of the light guide holding portion is restricted to the longitudinal direction by a supporter-side concave-convex portion that is a supporter-side groove portion or a supporter-side protruding portion, at least one of the supporter-side groove portion or the supporter-side protruding portion being formed on the supporter along the longitudinal direction,
the supporter includes two of the supporter-side concave-convex portions facing each other, and the light guide holding portion is arranged between the two supporter-side concave-convex portions,
the supporter supports the light guide holding portion with the light guide holding portion exposed in an imaginary plane on which the longitudinal direction intersects with a facing direction in which the two supporter-side concave-convex portions face each other,
the housing includes a concave portion that is recessed along a height direction perpendicular to the imaginary plane and that supports or houses at least the light guide holding portion and the supporter, and
the illumination device further comprises an engaging portion that is formed along the height direction, projects from the supporter on a side of the supporter opposite to a side on which the light guide holding portion is arranged, and touches the concave portion.

11. The illumination device according to claim 10, wherein
the light guide holding portion includes a light guide holding portion-side concave-convex portion that has a shape corresponding to a shape of the supporter-side concave-convex portion and that is formed along the longitudinal direction.

12. The illumination device according to claim 11, wherein
the light guide holding portion-side concave-convex portion is formed in at least one of the light guide insertion portion or the light source base plate.

13. The illumination device according to claim 12, wherein
the light guide holding portion-side concave-convex portion is at least one of a light guide holding portion-side groove portion or a light guide holding portion-side protruding portion.

14. The illumination device according to claim 12, wherein
at least one of the supporter-side concave-convex portion or the light guide holding portion-side concave-convex portion touches the housing.

15. The illumination device according to claim 11, wherein
the light guide holding portion-side concave-convex portion is at least one of a light guide holding portion-side groove portion or a light guide holding portion-side protruding portion.

16. The illumination device according to claim 11, wherein
at least one of the supporter-side concave-convex portion or the light guide holding portion-side concave-convex portion touches the housing.

17. An illumination device comprising:
a rod-shaped light guide extending in a longitudinal direction and configured to guide light entering from an end surface and emit the light as linear light from a lateral surface;
a light guide holding portion having
a hole into which the end surface of the light guide is inserted,
a light guide insertion portion having an opening provided on an opposite surface opposite to a surface in which the end surface of the light guide is inserted, the opening optically communicating with the hole, and
a light source base plate that is arranged on the opposite surface-side and that includes a light source to emit light through the hole;
a supporter supporting the light guide holding portion slidably along the longitudinal direction; and
a housing supporting or housing the light guide, the light guide holding portion, and the supporter, at least the supporter being fixed to the housing, wherein
a direction of sliding of the light guide holding portion is restricted to the longitudinal direction by a supporter-side concave-convex portion that is a supporter-side groove portion or a supporter-side protruding portion, at least one of the supporter-side groove portion or the supporter-side protruding portion being formed on the supporter along the longitudinal direction,
the light guide holding portion includes a light guide holding portion-side concave-convex portion that has a shape corresponding to a shape of the supporter-side concave-convex portion and that is formed along the longitudinal direction, and the light guide holding portion-side concave-convex portion is formed in the light guide insertion portion.

18. The illumination device according to claim 17, wherein
- the supporter includes two of the supporter-side concave-convex portions facing each other, and the light guide holding portion is arranged between the two supporter-side concave-convex portions,
- the supporter supports the light guide holding portion with the light guide holding portion exposed in an imaginary plane on which the longitudinal direction intersects with a facing direction in which the two supporter-side concave-convex portions face each other,
- the housing includes a concave portion that is recessed along a height direction perpendicular to the imaginary plane and that supports or houses at least the light guide holding portion and the supporter, and
- the illumination device further comprises an engaging portion that is formed along the height direction, projects from the supporter on a side of the supporter opposite to a side on which the light guide holding portion is arranged, and touches the concave portion.

19. The illumination device according to claim 17, wherein
- the light guide holding portion-side concave-convex portion is at least one of a light guide holding portion-side groove portion or a light guide holding portion-side protruding portion.

20. The illumination device according to claim 17, wherein
- at least one of the supporter-side concave-convex portion or the light guide holding portion-side concave-convex portion touches the housing.

* * * * *